(12) United States Patent
Hawkins et al.

(10) Patent No.: US 8,505,742 B2
(45) Date of Patent: Aug. 13, 2013

(54) PERFORATED HEXAGON-HOLE TUBE SUPPORT FOR SYNTHETIC SCREEN SEPARATOR

(75) Inventors: David Stanley Hawkins, Colorado Springs, CO (US); Carl Robert Perkins, Colorado Springs, CO (US); Gregory Scott Sprenger, Evergreen, CO (US)

(73) Assignee: Velcon Filters, LLC, Colorado Springs, CO (US)

( * ) Notice: Subject to any disclaimer, the term of this patent is extended or adjusted under 35 U.S.C. 154(b) by 194 days.

(21) Appl. No.: 12/914,126

(22) Filed: Oct. 28, 2010

(65) Prior Publication Data

US 2011/0100899 A1    May 5, 2011

Related U.S. Application Data

(60) Provisional application No. 61/256,035, filed on Oct. 29, 2009.

(51) Int. Cl.
*B01D 35/30* (2006.01)
*B01D 35/00* (2006.01)
*B01D 35/28* (2006.01)
*B01D 29/13* (2006.01)

(52) U.S. Cl.
USPC ............ 210/437; 210/232; 210/435; 210/457

(58) Field of Classification Search
USPC ....................................................... 210/457
See application file for complete search history.

(56) References Cited

U.S. PATENT DOCUMENTS

| | | | |
|---|---|---|---|
| 2,035,758 A * | 3/1936 | Pierce | 210/457 |
| 3,283,906 A | 11/1966 | Crane | |
| 3,616,921 A | 11/1971 | Bray | |
| 5,478,483 A | 12/1995 | Gore | |
| 6,068,723 A | 5/2000 | Sprenger et al. | |
| 6,206,205 B1 * | 3/2001 | Durre et al. | 210/457 |
| 6,415,930 B1 | 7/2002 | Sprenger et al. | |
| 7,247,240 B2 | 7/2007 | Hashimoto et al. | |
| 7,270,755 B2 | 9/2007 | Schwartzkopf | |
| 7,282,142 B2 | 10/2007 | Kraft | |
| 7,485,223 B2 | 2/2009 | Eijt et al. | |
| 7,585,410 B2 | 9/2009 | de Strulle | |
| 2002/0000407 A1 * | 1/2002 | Seiler | 210/457 |
| 2003/0155293 A1 * | 8/2003 | McGrath et al. | 210/457 |
| 2005/0103701 A1 * | 5/2005 | Bechtum et al. | 210/340 |
| 2009/0120874 A1 | 5/2009 | Jensen et al. | |

* cited by examiner

*Primary Examiner* — Benjamin Kurtz
(74) *Attorney, Agent, or Firm* — Fraser Clemens Martin & Miller LLC; J. Douglas Miller

(57) ABSTRACT

A separator cartridge includes a support tube formed of a perforated strip of metal configured to normally have a first diameter and a spaced array of hexagonal apertures formed therein and a substantially cylindrical screen member having a diameter less than the first diameter of the support tube, wherein a diameter of the support tube is decreased from the first diameter to a diameter less than the diameter of the screen member to be received in the screen member, and wherein the support tube causes the screen member to be maintained in a substantially taut manner.

16 Claims, 2 Drawing Sheets

PERFORATED HEXAGON-HOLE TUBE SUPPORT FOR SYNTHETIC SCREEN SEPARATOR

CROSS-REFERENCE TO RELATED APPLICATION

This application claims the benefit of U.S. Provisional Patent Application No. 61/256,035 filed on Oct. 29, 2009, the entire disclosure of which is incorporated herein by reference.

FIELD OF THE INVENTION

The invention relates generally to filter/separators for removing water and particulate contaminants form hydrocarbon fluids, such as jet aviation fuels, and more particularly to a second stage filter utilizing hydrophobic fine mesh plastic screens supported by a high open area support structure.

BACKGROUND OF THE INVENTION

Filter/separators have been used in the aviation fueling industry for decades. These devices generally contain filter cartridges which also act either as a coalescer or separator. The separators of the prior art typically comprise a fluoropolymer coated onto a metal screen which has been formed into a cylinder. The fluorocarbon coating imparts water repellency to the filter, thereby causing the water to separate from the filtered stream. However, the process for applying the coating, as well as the fluoropolymer coating itself, continue to be relatively expensive.

In an effort to improve separators, while at the same time making them more cost effective, other screen materials have been utilized in the recent prior art devices. Specifically, screens made from plastic materials have been favored. Plastic screens may be formed with more threads per square inch than metal screens, due to smaller filament diameters and more efficient manufacturing methods. Moreover, alternative hydrophobic coatings applied to plastic screens are generally silicone-based compounds which are less expensive than fluoropolymers.

Plastic screens used in the conventional separators are extremely flexible. Accordingly, the plastic screens must be adequately supported within the separator to perform the filtration and water separation to resist collapsing due to operational pressures of the fluid passing therethrough. Preferably, the screen must be maintained in a smooth taut cylindrical configuration. Satisfactory results have typically been achieved by placing the screen material over a metal tube perforated to create 55 to 60 percent open area. A practical limit for circular apertures is 62% open area. It has been found to be difficult to form a metal support tube having a greater amount of perforated area, which also returns the rigidity necessary to support the surrounding plastic screen under the typical operating conditions.

It would be desirable to produce a separator cartridge wherein the support tube for the screen may be provided with greater open area.

SUMMARY OF THE INVENTION

Concordant and consistent with the present invention, a separator cartridge has been surprisingly discovered embodying the desirable features mentioned above.

In one embodiment, a separator cartridge comprises: a support tube formed of a perforated strip of metal configured to normally have a first diameter and a spaced array of hexagonal apertures formed therein; and a substantially cylindrical screen member having a diameter less than the first diameter of the support tube, wherein a diameter of the support tube is decreased from the first diameter to a diameter less than the diameter of the screen member to be received in the screen member, and wherein the support tube causes the screen member to be maintained in a substantially taut manner.

In another embodiment, a separator cartridge comprises: a support tube formed of a perforated strip of metal configured to normally have a first diameter and a spaced array of regular hexagonal apertures formed therein to provide an open area of at least 65% of a total surface area of the support tube; and a substantially cylindrical screen member having a diameter less than the first diameter of the support tube, wherein a diameter of the support tube is decreased from the first diameter to a diameter less than the diameter of the screen member to be received in the screen member, and wherein the support tube causes the screen member to be maintained in a substantially taut manner.

The present invention also includes methods of forming a separator cartridge.

One method comprises the steps of: providing a support tube formed of a perforated strip of metal configured to normally have a first diameter and a spaced array of hexagonal apertures formed therein; providing a cylindrical screen member having a diameter less than the first diameter of the support tube; applying a force to the support tube to constrict a diameter from the first diameter to a constricted diameter that is smaller than the first diameter; disposing the cylinder screen member around at least a portion of the support tube to extend over the apertures of the support tube while the diameter of the support tube is constricted from the first diameter; and releasing the support tube to increase the constricted diameter to approaching but less than the first diameter to maintain the screen taut.

BRIEF DESCRIPTION OF THE DRAWINGS

The above, as well as other objects and advantages of the invention will become readily apparent to those skilled in the art from reading the following detailed description of a preferred embodiment of the invention when considered in the light of the accompanying drawings, in which.

DETAILED DESCRIPTION OF THE PREFERRED EMBODIMENT OF THE INVENTION

Figure 1:
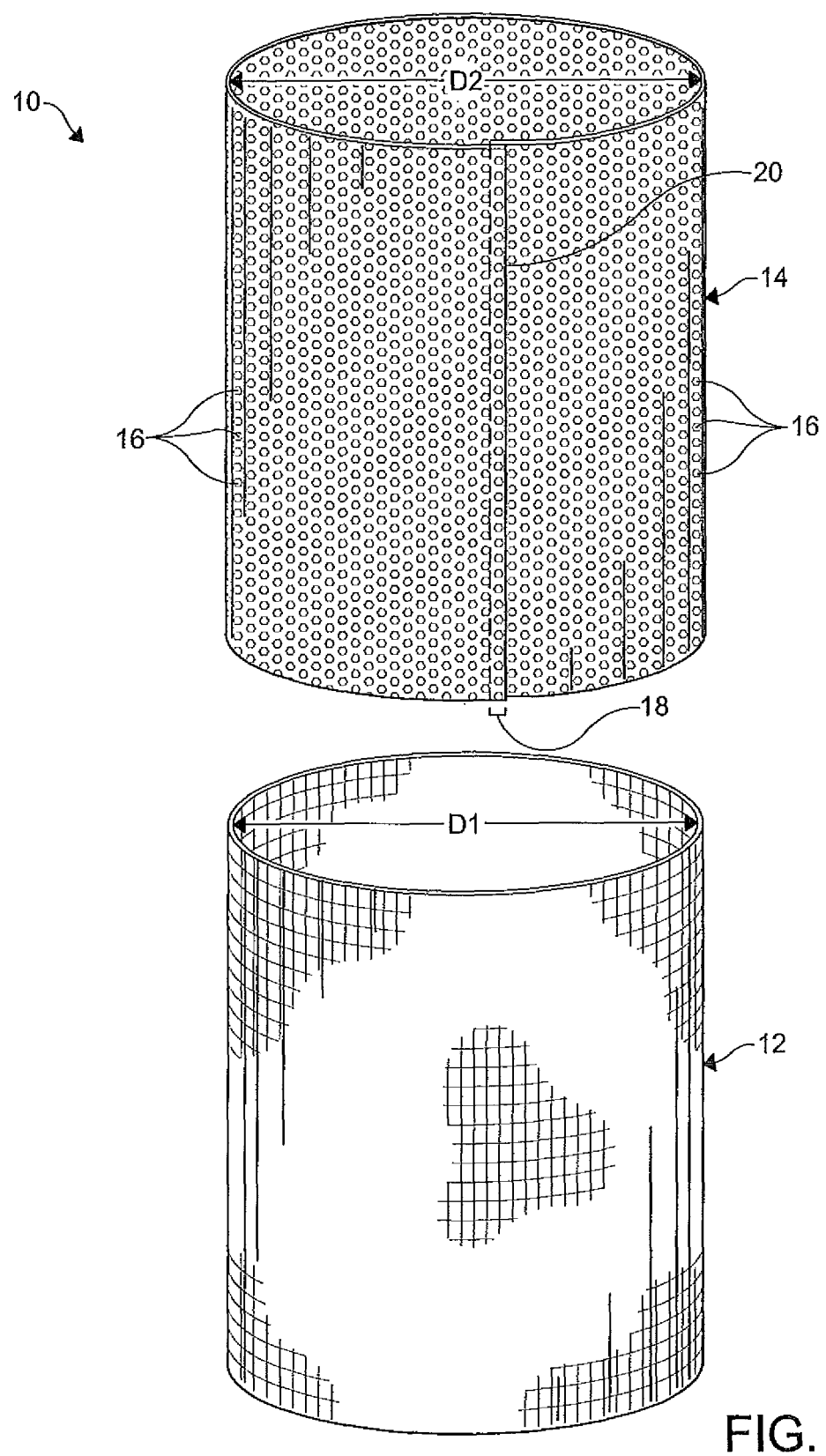
FIG. 1 is an exploded perspective view of a filter/separator incorporating the features of the above invention.
Figure 2:
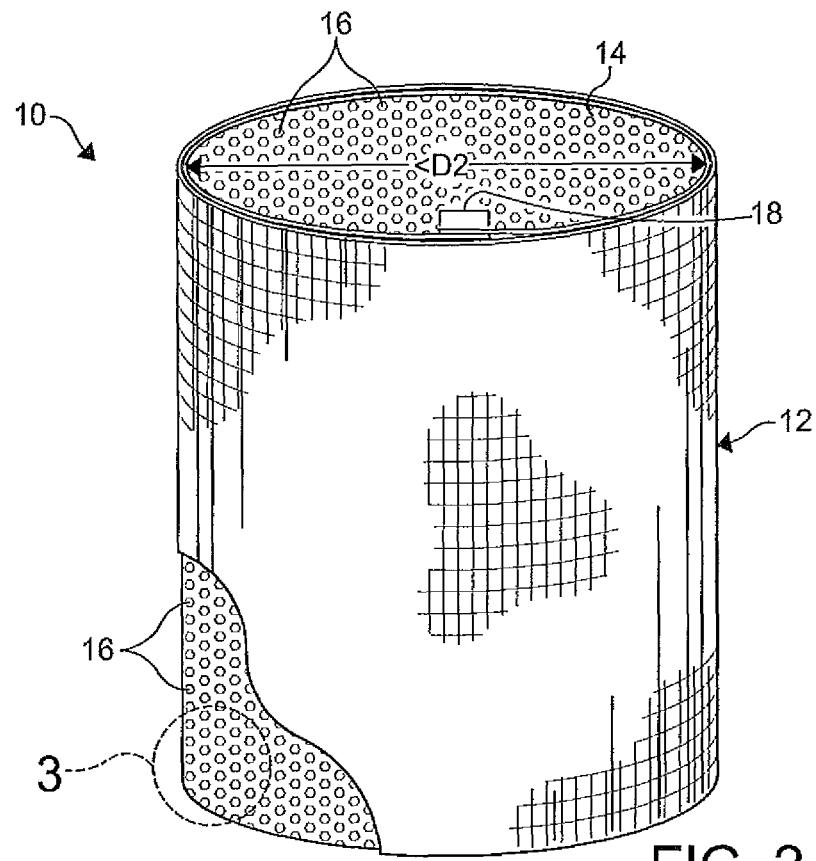
FIG. 2 is a perspective view of the filter/separator of FIG. 1 in an assembled configuration and a portion of a screen member cut away.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Referring now to the drawings, there is illustrated a separator cartridge 10 including a cylindrical screen member 12 and a support tube 14, at least partially disposed within the cylindrical screen member 12.

The cylindrical screen member 12 is typically formed from a plastic. In certain embodiments, the screen member 12 is cured during the manufacture of the separator cartridge 10, thus forming a substantially rigid cylinder having an inside diameter D1. As a non-limiting example, materials such as phenolic resin, polycarbonate resin, polyester resin, polyamide resin, nylon resin, acetal resin, urethane resin, methacrylate resin, ureaformaldehyde resin, and the like, as well as blends and copolymers may be used to form the screen member. However, other materials can be used.

The support tube 14 is typically fabricated from a strip of metal having a plurality of hexagonal apertures 16 formed therein. As a non-limiting example, the hexagonal apertures 16 are each regular hexagons and are arranged in a sixty degree)(60° configuration. The regular hexagon shape of the hexagonal apertures 16 provides for a tight packing of the hexagonal apertures 16 (i.e. minimized spacing between adjacent ones of the hexagonal apertures 16), thereby achieving a collective open area greater than 65% of the surface area of the support tube 14.

Figure 3:
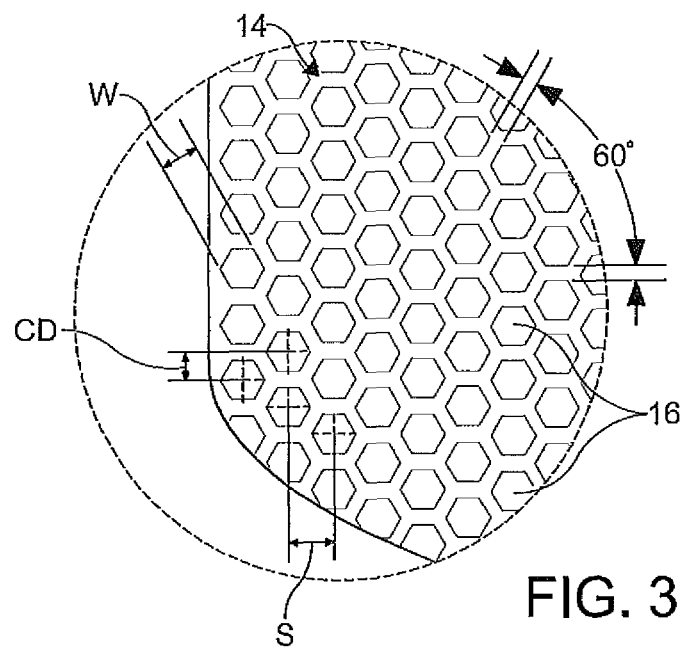
FIG. 3 is an enlarged fragmentary perspective view of the perforation pattern of a support tube illustrated in circle 3 of FIG. 2.

The pattern of hexagonal apertures 16 is typically punched in a sheet material. It has been found that satisfactory results have been achieved by utilizing a cold rolled steel (CRCS) (e.g. 18 gauge) with regular hexagon holes with about 0.25 inches width W punched on sixty degree)(60° staggered centers (i.e. 60 degree arrangement). (See FIG. 3). As a non-limiting example, a distance S between center points of adjacent ones of the hexagonal apertures is between 0.3 inches and 0.35 inches apart (e.g. preferably about 0.31" apart). As a further non-limiting example, a cross dimension CD of center points of adjacent ones of the hexagonal apertures of the support tube is between 0.25 and 0.275 inches (e.g. preferably 0.268 inches). The embodiment maximizes an open area and has sufficient thickness and stiffness to provide support to the separator cartridge 10. It is understood that other dimensions can be used.

The support tube 14 having the hexagonal apertures 16 formed therein is typically rolled into a substantially cylindrical shape, wherein a portion 18 of the sheet material forming the support tube 14 adjacent one end of the support tube 14 overlaps an opposite end of the support tube 14 to form a seam 20 along a length thereof. The overlapping portion 18 allows the support tube 14 to be made with a normal diameter D2 that is larger than the diameter D1 of the cylindrical screen member 12.

In use, the support tube 14 is circumferentially constricted/constrained (e.g. by applying a force to an outer surface of the support tube 14) to decrease a diameter of the support tube 14 to less than the normal diameter D2. Once in the constrained configuration, the cylindrical screen member 12 is disposed around the support tube 14 and fitted over at least a portion of the hexagonal apertures 16 of the support tube 14. Once the cylindrical screen member 12 is disposed around the support tube, the support tube is released, thereby allowing the support tube to increase the diameter to approaching but less than the normal diameter D1. The support tube 14 springs outward to hold the cylindrical screen member 12 in a taut configuration, which facilitates proper performance of the separator cartridge 10.

The separator cartridge 10 including the support tube 14 with the hexagonal apertures 16 formed therein maximizes an open area while retaining its stiffness to provide support to the cylindrical screen member 12. The separator cartridge 10 is particularly useful for filtering and supporting water from a flowing stream of an organic liquid, such as filtering and de-watering aviation fuels, motor vehicles fuels, dielectric fluids, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A separator cartridge comprising:
   a support tube formed of a perforated strip of metal configured to normally have a first diameter and a spaced array of hexagonal apertures formed therein; and
   a substantially cylindrical screen member having a diameter less than the first diameter of the support tube, the support tube received in the screen member, wherein a diameter of the support tube is decreased from the first diameter to a diameter less than the diameter of the screen member, and
   wherein the hexagonal apertures of the support tube are arranged to provide an open area of at least 65% of a total surface area of the support tube while still having a sufficient spring force to cause the screen member to be maintained in a substantially taut manner by springing outward against the screen member.

2. The separator cartridge according to claim 1, wherein the hexagonal apertures are regular hexagons.

3. The separator cartridge according to claim 1, wherein the hexagonal apertures of the support tube are formed in a sixty degree arrangement.

4. The separator cartridge according to claim 1, wherein at least one of the hexagonal apertures of the support tube has a width of about 0.25 inches.

5. The separator cartridge according to claim 1, wherein a center point of adjacent ones of the hexagonal apertures of the support tube are spaced between 0.3 inches and 0.35 inches apart.

6. The separator cartridge according to claim 5, wherein the center point of adjacent ones of the hexagonal apertures of the support tube are spaced about 0.31 inches apart.

7. The separator cartridge according to claim 1, wherein a cross dimension of a center point of adjacent ones of the hexagonal apertures of the support tube is between 0.25 and 0.275 inches.

8. The separator cartridge according to claim 7, wherein the cross dimension of a center point of adjacent ones of the hexagonal apertures of the support tube is about 0.268 inches.

9. The separator cartridge according to claim 1, wherein the support tube is formed from cold rolled sheet steel.

10. The separator cartridge according to claim 1, wherein the support tube is formed from 18 gauge sheet metal.

11. The separator cartridge according to claim 1, wherein the screen member is formed from plastic.

12. The separator cartridge according to claim 1, wherein the strip of metal forming the support tube is rolled into a substantially cylindrical shape having a portion of one end of the strip of metal overlapping a portion of another end of the strip of metal.

13. A separator cartridge comprising:
a support tube formed of a perforated strip of metal configured to normally have a first diameter and a spaced array of regular hexagonal apertures formed therein; and
a substantially cylindrical screen member having a diameter less than the first diameter of the support tube, the support tube received in the screen member, wherein a diameter of the support tube is decreased from the first diameter to a diameter less than the diameter of the screen member,
wherein the hexagonal apertures of the support tube are arranged to provide an open area of at least 65% of a total surface area of the support tube while still having a sufficient spring force to cause the screen member to be maintained in a substantially taut manner by springing outward against the screen member, and
wherein the support tube includes an overlay seam allowing a diameter of the support tube to be constricted to less than the first diameter.

14. A method of forming a separator cartridge, the method comprising the steps of:
providing a support tube formed of a perforated strip of metal configured to normally have a first diameter and a spaced array of hexagonal apertures formed therein;
providing a cylindrical screen member having a diameter less than the first diameter of the support tube;
applying a force to the support tube to constrict a diameter from the first diameter to a constricted diameter that is smaller than the first diameter;
disposing the cylinder screen member around at least a portion of the support tube to extend over the apertures of the support tube while the diameter of the support tube is constricted from the first diameter; and
releasing the support tube to increase the constricted diameter to approaching but less than the first diameter to maintain the screen member taut, wherein the hexagonal apertures of the support tube are arranged to provide an open area of at least 65% of a total surface area of the support tube while still having a sufficient spring force to cause the screen member to be maintained in a substantially taut manner by springing outward against the screen member.

15. The method according to claim 14, wherein the support tube further includes an overlap seam allowing a diameter of the support tube to be constricted to less than the first diameter.

16. The method according to claim 14, wherein the hexagonal apertures are each regular hexagons.

* * * * *